Sept. 30, 1969    G. ALTMAN    3,469,898
REFLEX REFLECTIVE PRODUCTS AND PROCESSES FOR THEIR MANUFACTURE
Filed Nov. 20, 1967    2 Sheets-Sheet 1

INVENTOR.
Gerald Altman
BY
Morse, Altman & Oates
ATTORNEYS

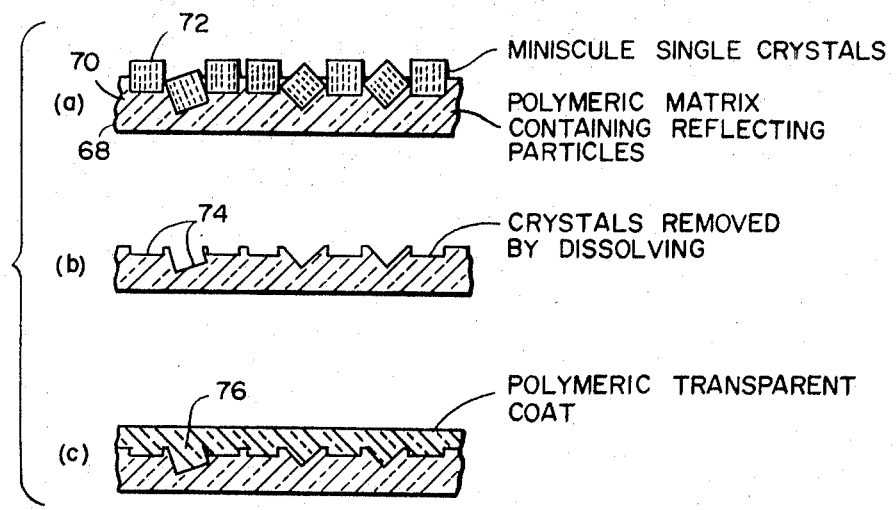
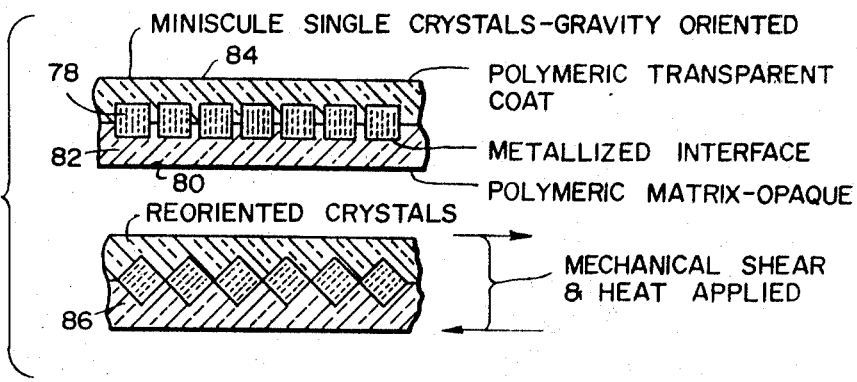
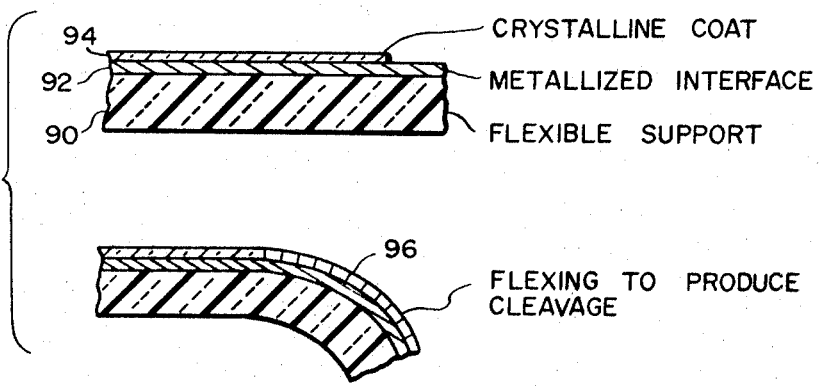

United States Patent Office

3,469,898
Patented Sept. 30, 1969

3,469,898
REFLEX REFLECTIVE PRODUCTS AND PROCESSES FOR THEIR MANUFACTURE
Gerald Altman, Newton, Mass.
(41 Westminster Road, Newton Centre, Mass. 02159)
Continuation-in-part of application Ser. No. 226,631, Sept. 27, 1962. This application Nov. 20, 1967, Ser. No. 684,338
Int. Cl. G02b 5/12
U.S. Cl. 350—103                        11 Claims

ABSTRACT OF THE DISCLOSURE

Minute reflex reflecting particles for use in thin reflex reflecting sheets, as fluid reflex reflecting pigment, or the like, are provided in the form of optically clear "single crystals," of which rearward facets are metallized to provide reflex reflecting corners and forward facets are clear to provide paths to and from the reflex reflecting corners.

BACKGROUND AND SUMMARY

The present invention relates to the reflex reflection of radiation and, more particularly, to reflectors of the type which are capable of receiving a beam of radiation along a path in one direction at a particular angle of incidence and returning the beam along the path in the opposite direction with small or minimum dispersion. A variety of reflex reflective elements are well known, of which two types are: a lens-reflector type, for example in the form of a sphere having a forward refractive surface that focuses incident radiation and a reflective rearward surface that returns radiation so focused; and a corner reflector type, for example presenting three mutually perpendicular reflecting faces that cooperate to return any incident beam substantially along its original path. The lens-reflector type is characterized by inherent dispersion whereas the cube corner type is characterized by practically perfect reflex reflection. Relatively large reflex reflecting elements of both types are widely applicable. However, it is often desired that miniscule reflex reflecting elements be available for such purposes as flexible tape, fluid lacquer, etc. Of the two types, only the lens-reflector type, in the form of minute spheres having inherent dispersion, has been used for such purposes. In other applications, the practically perfect reflex reflection of the cube-corner type is desirable. The present invention contemplates a simple technique by which miniscule cubecorner reflectors are provided for use in flexible tape, fluid lacquer, etc.

The primary object of the present invention is to provide processes and products in which reflecting corners are defined by the mutually intersecting facets inherently occurring in certain natural solid "single crystals." As is well known, a single crystal is a solid, throughout which the atoms or molecules are arranged in a regular repeating pattern or lattice. Crystalline solids, which are composed of many single crystals called "grains," are said to be "polycrystalline." Single crystals differ from polycrystalline and amorphous substances in that their properties are anisotropic, as a result of which "growth" and "cleavage" occur along flat planes. Growth occurs when the crystal forms atom-by-atom, for example, from chemical solution. Cleavage occurs when the crystal is formed, for example, by crushing. In various forms of the present invention: the crystals are transparent so that they may remain permanently as associated components of a relatively extensive reflex reflective structure; the crystals, after having determined the configuration of an associated matrix are dissolved or otherwise removed in order to avoid any adverse optical effect on radiation incident upon the matrix; the crystal corners are oriented randomly so as to produce optimum reflex reflectivity throughout a wide solid angle; certain of the crystal facets are aligned to produce maximum reflectivity in a given direction; and transmitting portions of the crystals, of particular index of refraction, are in cotnact with a coating of like index of refraction to reduce undesired reflection.

Other objects of the present invention will in part be obvious and will in part appear hereinafter.

The invention accordingly comprises the processes and products possessing the features, properties and relationships which are exemplified in the following detailed disclosure, the scope of which will be indicated in the appended claims.

BRIEF DESCRIPTION OF DRAWINGS

For a fuller understanding of the nature and objects of the present invention references should be had to the following description taken in connection with the accompanying drawing wherein:

FIG. 4 illustrates materials undergoing a further process and a resulting product, in accordance with the present invention;

FIG. 5 illustrates materials undergoing still another process and a resulting product, in accordance with the present invention; and FIG. 6 illustrates materials undergoing still a further process and a resulting product, in accordance with the present invention.

DETAILED DESCRIPTION

Figure 1:
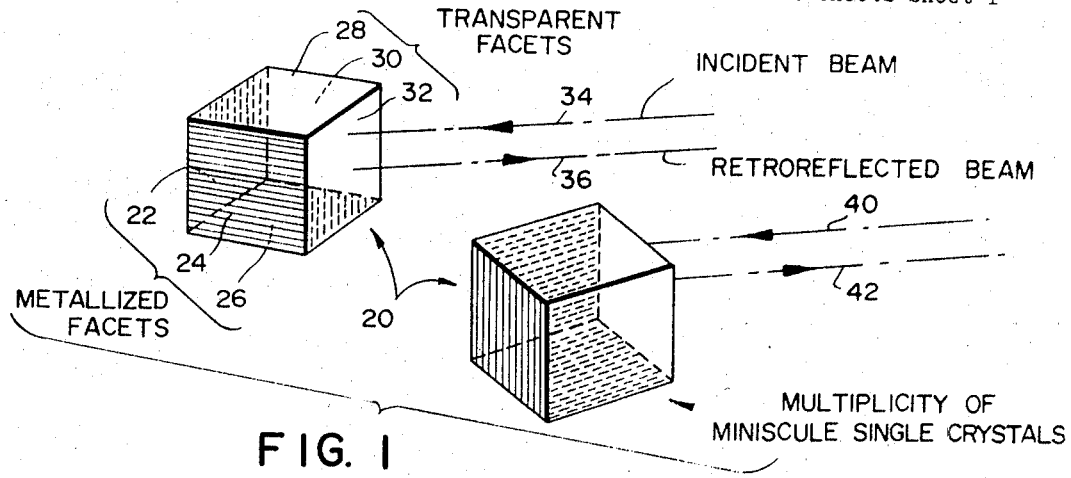
FIG. 1 is an exaggerated isometric view of partly transparent, partly reflective crystals that are operatively reflex reflecting a beam of radiation in accordance with the present invention.

The illustrated processes and products contemplate forming a multiplicity of cube corners by utilizing miniscule single crystals having external intersecting facets, certain facets of which are metallized and remaining facets of which avoid any obstruction to radiation incident on the metallized facets. In a first process of the invention, the single crystals are disposed on a support and coated with a polymeric matrix, the metallic coating on the corners either being deposited on the crystals before the matrix is supplied or being provided by the matrix initially. In another process, the single crystals are entirely metallized and thereafter provided with transparent facets by mechanical abrasion, chemical etching, electron bombardment or the like. In another process, the single crystals and matrix are distributed as above but the crystals are dissolved or otherwise removed from the matrix thereafter, leaving the metallized cube corner interfaces free on one side for replacement by a protective polymer of desired optical characteristics. In a further process, the single crystals are formed in situ as by vacuum vapor depositing a stratum of the crystalline material on a metallic base and flexing the composite sheet to produce cleavage in the crystalline material.

Suitable single crystals are: of cubic structure, uniaxial structure or biaxial structure, particularly alkali metal halide such as sodium chloride and potassium chloride or transition metal halide such as silver chloride.

The reflective coating is composed of a highly reflective metal such as silver, aluminum or chromium, deposited in any suitable way, e.g., by vacuum vapor deposition, chemical vapor deposition, etc. The polymeric matrix, preferably, is composed of a synthetic plastic, for example, a cellulosic such as cellulose nitrate, ethyl cellulose, cellulose acetate or cellulose butyrate, an acrylic such as ethyl or methyl methacrylate, a vinyl such as polyvinyl formal or polyvinyl butyral, a styrene such as polystyrene, an epoxy such as that formed by reaction of a polyalcohol and epichlorohydrin, polyolefin such as polyethylene, tetrafluoroethylene or chlorotrifluoroethylene, and a linear polyamide such as polyhexamethylene adipamide or polycaprolactam. In various forms of the invention: the polymer is optically clear as at the forward face of the product; contains an opaque pigment as at the rearward face of the product; or contains a reflective metallic filler having primary utility at the cube corner interfaces.

The radiation contemplated primarily herein falls within selected wavelength intervals in the visible and infrared regions of the electromagnetic spectrum and the material of the crystal, as well as any plastic coating for its transparent facets, is transparent to such selected wavelength intervals. Where the indices of refraction of the crystal and plastic are approximately the same, reflection therebetween is minimized. Preferably the polymer is waterproof in order to protect the crystals from chemical attack as well as abrasion. Preferably the overall thickness of the product is less than 0.1 inch and the product is flexible, the components of the product being sufficiently securely bonded to permit considerable deformation without cleavage.

One product of the present invention is illustrated in FIG. 1 as comprising a plurality of randomly oriented transparent single crystals 20 (e.g., sodium chloride) each having a plurality of facets. Of these, facet triad 22, 24, 26 is shown as being metallized (e.g., silver or aluminum) and the remaining facets 28, 30, 32 are shown as being transparent. It will be observed that incident rays of radiation 34 and 40 and returned rays of radiation 36 and 42 all are substantially parallel notwithstanding the different orientations. In an example of this form of the invention, the single crystals (preferably predominantly less than 0.0005 inch in maximum extent) constitute a free flowing mass of randomly oriented cubes which may be distributed from a transparent varnish solution of the following approximate composition by total weight: semimetallized crystals 8 parts; a 50–50 copolymer of methyl and butyl methacrylate 10 parts; dibutyl phthalate 5 parts; toluene 77 parts.

Figure 2:
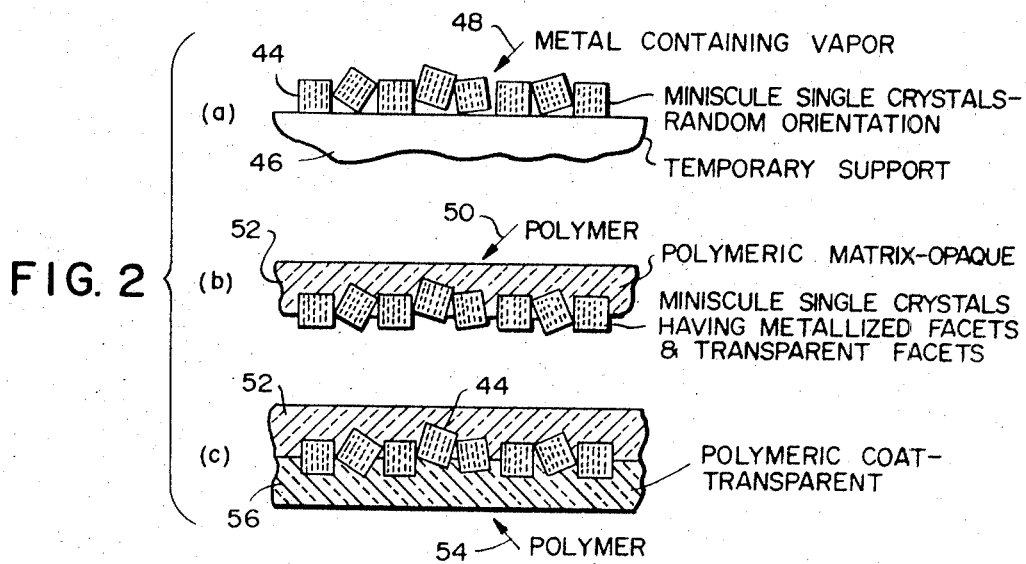
FIG. 2 illustrates materials undergoing a process and a resulting product, in accordance with the present invention.

In the process of FIG. 2, first a layerwise distribution of single crystals 44 is disposed upon a suitable temporary support 46. Next the facets of single crystals 44 that are exposed in a particular direction are coated with metal by a stream of vapor 48 incident from that direction. In consequence, the exposed facets are metallized and the concealed facets remain clear. Then the metallized facets are coated with a polymer 50 to form a matrix 52. Finally, the clear facets are coated with a transparent polymer 54 to form a protective coat 56. In a specific example of the process of FIG. 2, crystals 44 are in the form of chemically pure sodium chloride cubes approximately 0.0005 inch at each edge. These cubes are closely packed by sprinkling onto support 46 and vibrating support 46 until distribution 44 appears under a magnifying glass to be substantially one grain thick. Metal vapor 48 is deposited under noncritical conditions to provide a coat sufficiently thick to eliminate transmission in the optical and infrared radiation ranges. One form of polymer streams 50 and 54, which are aspirated from a suitable container, include a mixture by approximate total weight of ethyl cellulose 14%, ethyl acetate 13%, butylacetate 15%, Cellosolve acetate 8% and toluene 50%. Sodium chloride crystals 44 and transparent polymeric coat 56, which, as above, is composed of ethyl cellulose, each has as an index of refraction such that $n_d^{25}=1.5$. The product is a flexible strip displaying marked retroreflectivity.

Figure 3:
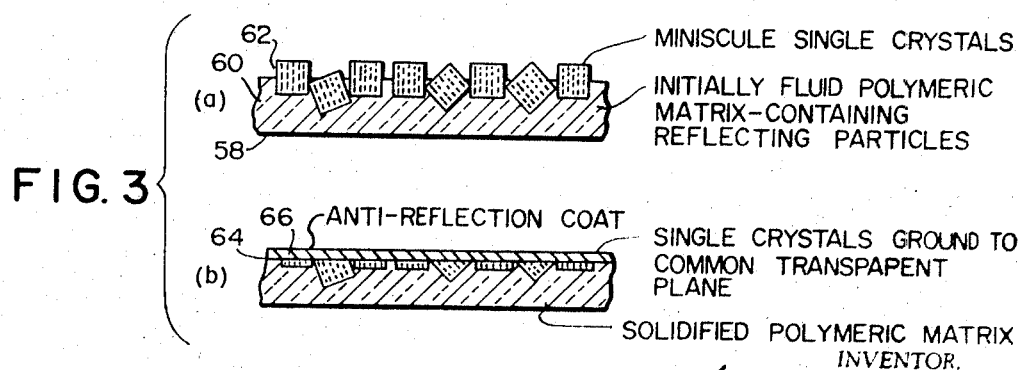
FIG. 3 illustrates materials undergoing another process and a resulting product, in accordance with the present invention.

In the process of FIG. 3, first a layer containing a mixture of fluid polymer 58 and minute aluminum flakes 60 is formed. Next a multiplicity of single crystals 62 is dispersed under gravity upon this layer so that the inner facets of these single crystals come into contact with aluminum flakes 60. Next fluid polymer 58 is solidified with inner portions of single crystals 62 are imbedded therein. Then the outer portions of single crystals 62 are ground to a common plane 64. In one form of the invention, common plane 64 is coated with an antireflection coating 66 that is equal in thickness to a quarter of the wavelength of light at the middle of the visible spectrum. It will be understood that the antireflection coating may be adapted to any chosen wavelength by choosing its thickness to be one quarter of that wavelength. In a specific example of the process of FIG. 3, single crystals 62 and matrix 58 are identical to single crystals 62 and matrix 52 of FIG. 2, respectively. The grinding of the outer portions of single crystals 62 is effected by light contact with a fine file.

In the process of FIG. 4, first a layer containing a mixture of fluid polymer 68 and aluminum flakes 70 is formed. Next a multiplicity of single crystals 72 is dispersed under gravity upon this layer so that the inner facets of these single crystals come into contact with aluminum flakes 70. Next fluid polymer 68 is solidified with inner portions of single crystals 72 embedded therein. Then single crystals 72 are removed from matrix 68, 70 by dissolution in a solvent in which the matrix is immersed. Finally the resulting reentrant cube corners 74 are coated with a suitable polymeric stratum 76. In a specific example of the process of FIG. 4, single crystals 72 and matrix 68 are identical to single crystals 44 and matrix 52 of FIG. 2, respectively. The dissolution of single crystals 72 from matrix 68 is effected by immersion in water. After matrix 68 is dried, its reentrant cube corners are coated with polymer 76, which corresponds to polymer 50 of FIG. 2.

In the process of FIG. 5, an intermediate product comprising miniscule single crystals 78, matrix 80, metallized interface 82 and coating 84 corresponds in all respects to the final product of FIG. 2, except that single crystals 78 are at least partly oriented. After the formation of the intermediate product, its opposite faces are subjected to mechanical shear and heat of sufficient intensity to cause permanent reorientation of the crystals. Specifically, chosen axes of the crystals are reoriented into perpendicularity or other desired angularity with respect to the faces of the final product.

In the process of FIG. 6, a thin layer of ethyl cellulose, 2 mils thick, first is coated with a 1200 angstrom thick stratum of aluminum 92 and next with a ½ mil thick stratum of sodium chloride. Next the composite sheet is flexed in order to cleave the sodium chloride stratum into a multiplicity of minute single crystals 96. Finally, the sodium chloride stratum is coated with a 1.5 $n_d$ lacquer of one of the foregoing types for protection against ambient moisture. Here rays of light strike the side facets of any single crystal obliquely so as to be totally internally reflected and strike the inner metallized facet of any single crystal more or less perpendicularly so as to be returned.

CONCLUSION

The present invention thus provides processes and products whereby reflex reflection may be achieved in a wide variety of circumstances by exceedingly small cube corners. Since certain changes may be made in the foregoing processes and products without departing from the scope of the invention herein involved, it is intended that all matter contained in the above description or shown in the accompanying drawing shall be interpreted in an illustrative and not in a limiting sense.

PARENT APPLICATION

The present application is a continuation-in-part of United States patent application Ser. No. 226,631, filed Sept. 27, 1962, in the name of the applicant hereof for Retroreflective Products and Processes for Their Manufacture.

What is claimed is:

1. A reflex reflecting coating product comprising a freely flowable quantity of minute, optically clear, single anisotropic crystals having external facets, said crystals being characterized by a crystalline lattice structural arrangement, certain of said facets being metallized, said product effectively presenting minute reflex reflecting corners by which characteristically there is at most a small controlled angle between an original ray incident upon said product and a resulting ray returned by said product.

2. The product of claim 1 wherein said minute single crystals are less than 0.005 inch in maximum extent.

3. A reflex reflecting sheet comprising a stratum of light transparent single anisotropic crystals having intersecting external facets, said facets including clear forward facets for the acquisition of light and metallized rearward facets for the reflection of said light, said crystals being characterized by a crystalline lattice structural arrangement, said product presenting minute reflex reflecting corners by which characteristically there is at most a small controlled angle between an original ray incident upon said sheet and a resulting ray returned by said sheet.

4. The sheet of claim 3 wherein a flexible support is provided at said metallized rearward facets.

5. The sheet of claim 3 wherein a light transparent coating is provided at said clear forward facets, said single crystals and said transparent coating having substantially like indices of refraction.

6. The sheet of claim 3 wherein said intersecting external facets are at right angles to each other.

7. The sheet of claim 3 wherein the total thickness is less than 0.1 inch.

8. A reflex reflecting sheet having a support stratum with a highly reflective metal surface and a crystalline stratum, said crystalline stratum including single anisotropic crystals having facets at right angles to each other, said crystals being characterized by a crystalline lattice structural arrangement, certain ones of said facets being contiguously superposed on said metal surface and certain others of said facets being at right angles to said metal surface, whereby rays of light characteristically are returned by said ones of said facets and are totally internally reflected by said others of said facets.

9. The reflex reflecting sheet of claim 8 wherein, said single crystals are characterized by maximum dimensions less than 0.005 inch.

10. A process comprising the steps of:
    (1) distributing a multiplicity of minute optically clear single anisotropic crystals having external facets, said anisotropic crystals being characterized by a crystalline lattice structural arrangement,
    (2) metallizing certain of said facets and thereby effectively presenting minute reflex reflecting corners by which characteristically there is at most a small controlled angle between an original ray incident upon said crystals and a resulting ray returned by said crystals.

11. A process comprising the steps of:
    (1) providing a reflecting metal surface,
    (2) providing said surface with a thin single anisotropic crystal coating, said single anisotropic crystal coating being characterized by a crystalline lattice structural arrangement, and
    (3) flexing said reflecting metal surface and said thin single anisotropic crystal coating, thereby causing cleavage in said single anisotropic crystal coating and producing a product presenting minute reflecting corners by which characteristically there is at most a small controlled angle between an original ray incident upon said sheet and a resulting ray returned by said sheet.

References Cited

UNITED STATES PATENTS

| | | | |
|---|---|---|---|
| 1,902,440 | 3/1933 | Gill | 350—105 |
| 2,294,930 | 9/1942 | Palmquist | 350—105 |
| 2,354,048 | 7/1944 | Palmquist | 350—105 |
| 2,432,928 | 12/1947 | Palmquist | 350—105 |

DAVID SCHONBERG, Primary Examiner

PAUL R. GILLIAM, Assistant Examiner

U.S. Cl. X.R.

260—41; 350—105